United States Patent [19]

Lee et al.

[11] Patent Number: 5,622,907
[45] Date of Patent: Apr. 22, 1997

[54] POST-REDUCING TREATMENT OF ALCOHOL SYNTHESIS CATALYSTS WITH CARBON DIOXIDE

[75] Inventors: Sunggyu Lee; Vetkav R. Parameswaran; Byung G. Lee, all of Akron, Ohio; Conrad J. Kulik, Newark, Calif.

[73] Assignee: Electric Power Research Institute, Inc., Palo Alto, Calif.

[21] Appl. No.: 483,641

[22] Filed: Feb. 23, 1990

Related U.S. Application Data

[63] Continuation of Ser. No. 344,880, Apr. 28, 1989.

[51] Int. Cl.[6] .............................. B01J 21/18; B01J 23/06
[52] U.S. Cl. ............................ 502/174; 502/30; 502/53; 502/176; 502/244; 502/307; 502/342; 502/343
[58] Field of Search ...................... 502/174, 176, 502/244, 307, 342, 343, 30, 53

[56] References Cited

U.S. PATENT DOCUMENTS

| | | | |
|---|---|---|---|
| 3,850,850 | 11/1974 | Collins | 502/342 |
| 3,923,694 | 12/1975 | Cornthwaite | 502/342 |
| 4,111,847 | 9/1978 | Stiles | 502/342 |
| 4,386,017 | 5/1983 | Nakamura et al. | 502/202 |
| 4,436,833 | 3/1984 | Broecker et al. | 502/176 |
| 4,507,403 | 3/1985 | Asakawa | 518/713 |
| 4,535,071 | 8/1985 | Schneider et al. | 502/342 |
| 4,537,876 | 8/1985 | Blum et al. | 502/342 |
| 4,562,174 | 12/1985 | Stiles | 502/324 |
| 4,616,000 | 10/1986 | Mazanec et al. | 502/341 |
| 4,666,945 | 5/1987 | Osugi et al. | 502/208 |
| 4,801,574 | 1/1989 | Brown | 502/30 |
| 4,806,516 | 2/1989 | Osugi et al. | 502/202 |
| 4,826,798 | 5/1989 | Cheng | 502/244 |
| 4,886,651 | 12/1989 | Patel et al. | 423/359 |

FOREIGN PATENT DOCUMENTS 2529098  12/1983  France ............................ 502/343

*Primary Examiner*—Asok Pal
*Assistant Examiner*—Bekir L. Yildirim
*Attorney, Agent, or Firm*—Fish & Richardson P.C.

[57] ABSTRACT

A method is provided for improving the catalytic activity of an alcohol synthesis catalyst. In this method, the catalyst, after activation by exposure to a reducing atmosphere, is improved by contacting with a carbon dioxide-containing gas to convert the zinc oxide in the catalyst to zinc carbonate. This improvement step occurs in situ preferably in the same reactor as used for the synthesizing of the alcohol.

6 Claims, 3 Drawing Sheets

CRYSTALLITE SIZE DISTRIBUTION OF A POST-TREATED AND 60 HRS-AGED CATALYST

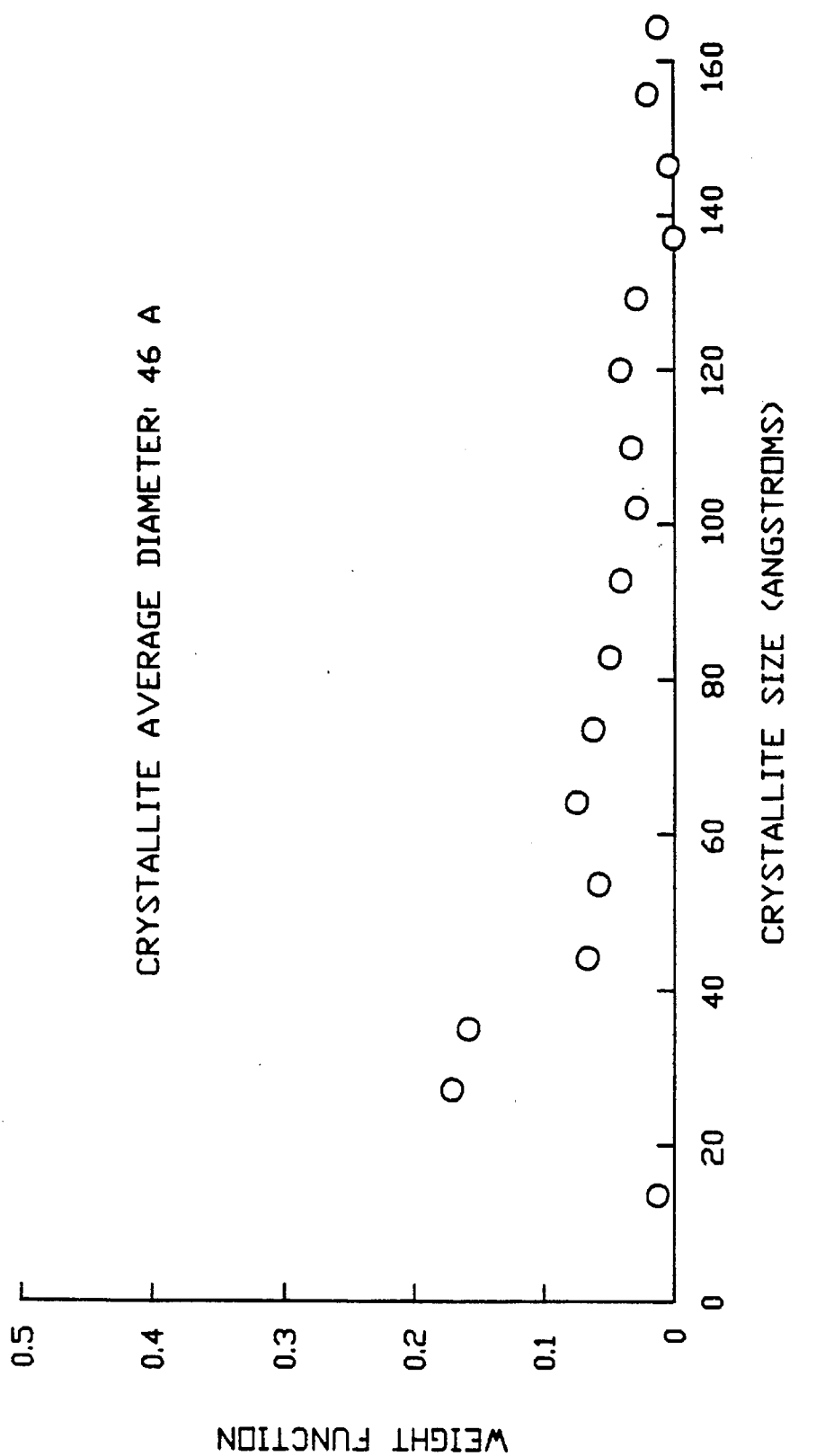
FIG.-2 CRYSTALLITE SIZE DISTRIBUTION OF A POST-TREATED AND 60 HRS-AGED CATALYST

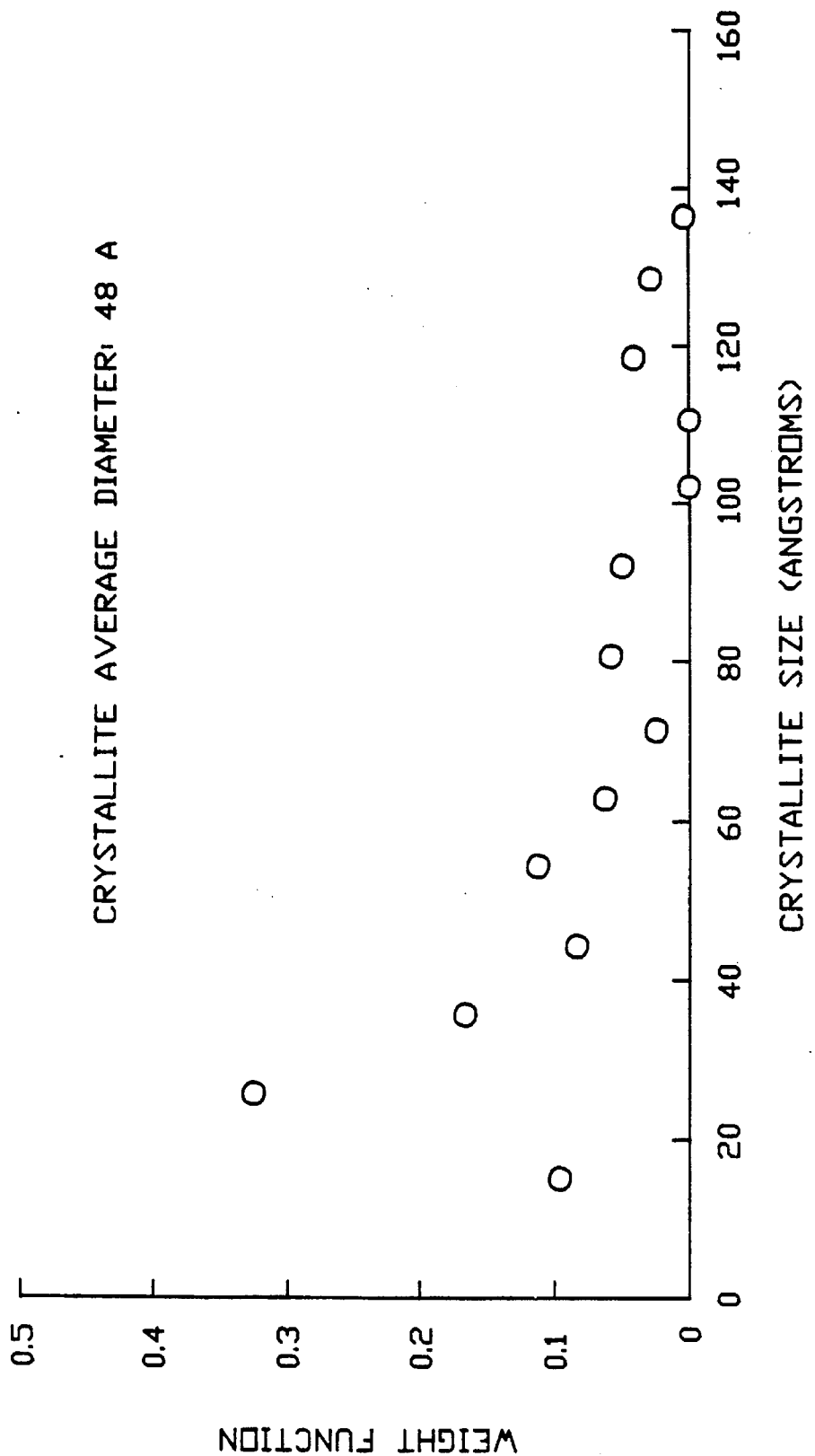

POST-REDUCING TREATMENT OF ALCOHOL SYNTHESIS CATALYSTS WITH CARBON DIOXIDE

This is a continuation of application Ser. No. 344,880 filed Apr. 28, 1989.

The present invention is directed to a method for improving the catalytic activity of an alcohol synthesis catalyst, particularly of a methanol synthesis catalyst. The invention is directed to improving catalysts which are used both for liquid phase alcohol synthesis or vapor phase alkanol synthesis. The present improvement may be carried out in situ in the liquid phase or vapor phase alkanol synthesis reactor.

BACKGROUND OF THE INVENTION

Synthesis of alcohols, particularly methanol, by the catalytic reaction of synthesis gas (syngas) is a well established chemical process. The process may be carried out either in a liquid phase or in a vapor phase utilizing a catalyst. In this process carbon monoxide and hydrogen are catalytically reacted to form methanol. A particular catalyst to which the present invention is directed comprises, in its as-provided form, a mixture of metal oxides consisting essentially of copper oxide, zinc oxide and an oxide selected from the group consisting of alumina, silica and chromia. Such catalysts must be activated before use to bring them to a catalytically active state for use in the methanol synthesis process. This requires reduction of one or more metal oxides to a more active lower oxidation valence state. Typically, in the liquid phase methanol synthesis a slurry system is used wherein the catalyst is suspended in an oil slurry. The reduction is usually accomplished by contacting metal oxide catalyst in the slurry with hydrogen gas in a controlled manner which typically reduces the copper oxide in the catalyst to metallic copper while still retaining the remaining metals in their oxide form, i,e., zinc oxide, alumina, silica and/or titania.

The present invention is directed to a method for improving the catalytic activity of such catalyst after the reduction to activate the catalyst.

It is thus an object of the present invention to provide a method for improving the catalytic activity of an alcohol synthesis catalyst by a post-reduction treatment.

It is yet another object of the present invention to provide a method for improving the catalytic activity of an alcohol synthesis catalyst which may be conducted in situ in the same reactor in which the methanol synthesis takes place.

These and other objects of the invention will be apparent from the following description and from practice of the invention.

SUMMARY OF THE INVENTION

The present invention provides a method for improving the catalytic activity of an alcohol synthesis catalyst, and in particular a methanol synthesis catalyst, after activation of the catalyst by reduction in a reducing atmosphere, comprising the step of exposing the catalyst to a carbon dioxide-containing atmosphere at a pressure in the range of about 1 to 100 atm and at a temperature in the range of about 10° to 250° C. for a period of time and at a partial pressure of carbon dioxide sufficient to convert a substantial amount of the zinc oxide in the catalyst to zinc carbonate. The present invention is particularly applicable to methanol synthesis catalysts comprising, in their as-provided form, copper oxide, zinc oxide and an oxide selected from the group consisting of alumina, silica and chromia.

In the preferred embodiment of the invention the improved activation is performed in a single reactor, which may be the same reactor utilized for the activation of the catalyst and for the synthesis of the alcohol. The present invention is applicable to catalytic systems in which the methanol synthesis occurs either in a liquid slurry with the catalyst or in a vapor phase.

BRIEF DESCRIPTION OF THE DRAWINGS

FIG. 2 shows the crystallite size distribution of the catalyst particles of a catalyst which has been treated in accordance with the present invention and which has been aged for 60 hours to simulate conditions of use in methanol synthesis.

FIG. 3 is the crystallite size distribution of particles which have not been treated according to the present invention and which have been aged for 60 hours under conditions to simulate use as a methanol synthesis catalyst.

DESCRIPTION OF THE INVENTION

Figure 1:
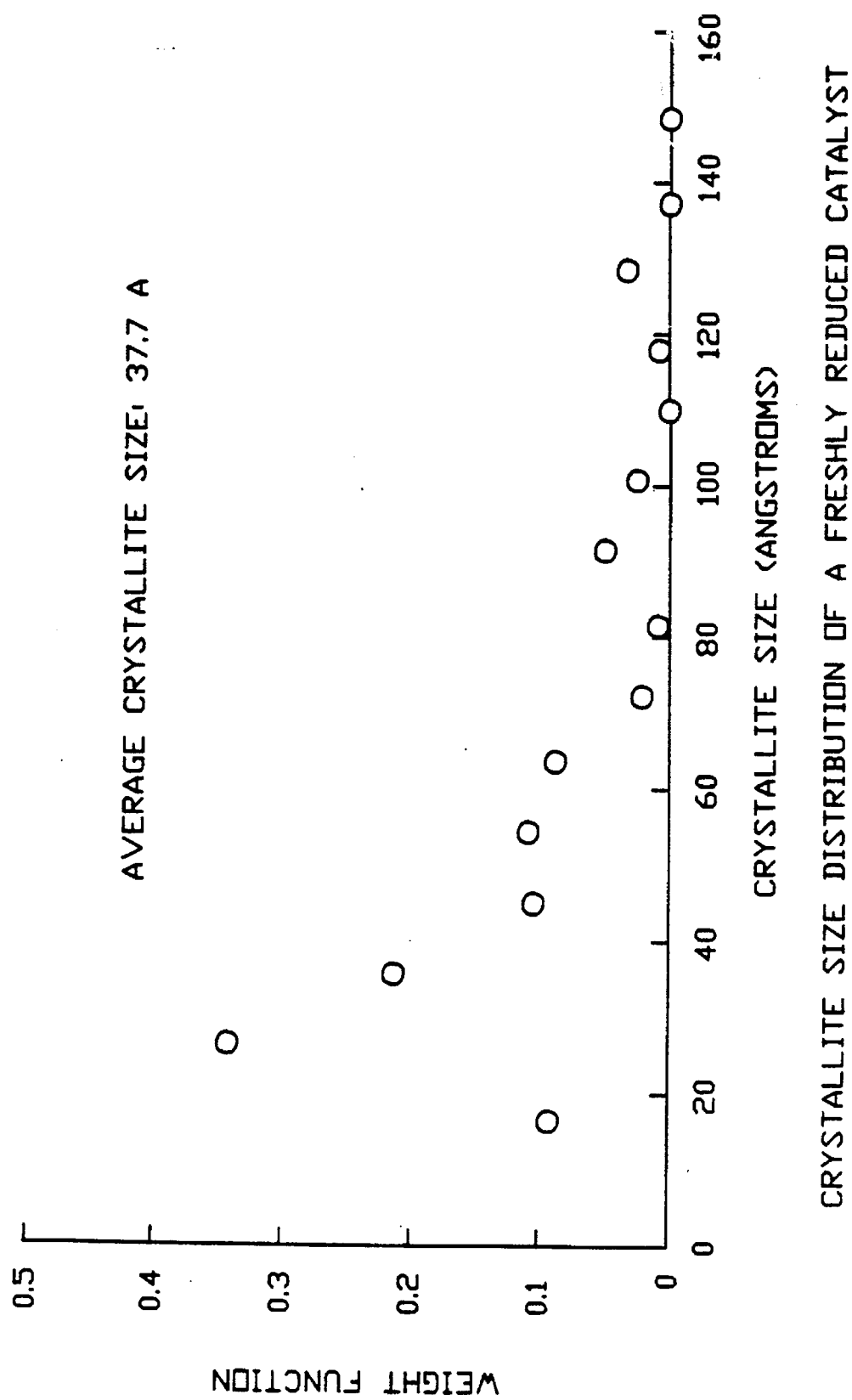
FIG. 1 is a graph showing the crystallite size distribution of a freshly reduced methanol synthesis catalyst prior to treatment according to the present invention.

Catalyst systems employed in the catalytic formation of alcohols, particularly methanol, from synthesis gas are well known. These catalysts typically contain, in their as-provided form, copper oxide, zinc oxide and an oxide selected from the group consisting of alumina, silica. and chromia. These catalysts must be reduced to a lower valence state prior to use, usually by treatment in a reducing atmosphere of hydrogen. Typically a catalyst is placed in the reaction vessel to be used for the methanol synthesis in an oil slurry or in the vapor phase mode and it is reduced in situ with the reducing atmosphere. A typical process for activating a methanol synthesis catalyst using a hydrogen reducing atmosphere is in *Fuel Science & Technology Int'l*, 5 (1), pp. 77–88 (1987), which is incorporated herein by reference. The treatment with the reducing atmosphere typically reduces the copper oxide to copper, while the other metal oxides, particularly the zinc oxide, remain as.oxides.

After activation with the reducing atmosphere the catalyst may be treated according to the present invention either in situ or withdrawn from the container and treated ex situ. It is preferred that the catalyst be treated in situ since it allows for less handling of the catalyst and for more economic and advantageous use of the invention. The gas atmosphere which is utilized to effect the improvement according to the present invention will be carbon dioxide containing. While pure carbon dioxide may be utilized, it is preferred since it is more economical to use a syngas which does not contain carbon monoxide. There may be other components in the syngas which are not believed to detrimentally affect the process of the present invention, such as methane and hydrogen.

The carbon dioxide-containing gas may be conducted to and reacted within the reactor using the same conduit lines and other apparatus utilized for effecting the reducing to activate the catalyst in the first instance. The total pressure of the gas utilized is conveniently in the range of about 1 to 100 atm, with the partial pressure of the carbon dioxide in the atmosphere being sufficient to convert most or a substantial amount of the zinc oxide contained in the catalyst as zinc carbonate. Typically the partial pressure of the carbon dioxide, as measured within the closed system of the reactor, will be in the range of about 100 to 300 psig. The temperature at which the process of the present invention will be carried out may typically be between ambient temperature, typically as low as about 10° C., up to about 250° C. Typically if room temperature (around 20° C.) is utilized, then the partial pressure of the carbon dioxide within the atmosphere may be even lower than 1 atm. In such an instance the conversion from zinc to zinc oxide will take place virtually spontaneously from thermodynamic standpoints, but very slowly from kinetic standpoints. However, it is not preferred that the reaction be conducted at such a slow rate but rather that the temperature and partial pressure of carbon dioxide be controlled so that the conversion from zinc to zinc carbonate takes place rapidly over a period of several hours, usually less than 12 hours. Typical conditions for effecting the conversion over a period of around 12 hours or less will be a temperature of about 250° C., with a total pressure of 1000 to 1500 psig of an atmosphere comprising at least 7% by volume carbon dioxide (and containing no carbon monoxide). By feeding the gas into the reactor in a continuous mode, with agitation, from about 2 to 3 mols/hr (based on a 1 liter volume reactor containing the catalyst in a slurry) the treatment will be completed in about 12 hours or less.

The present invention is particularly adapted for the treatment of catalysts used for liquid phase conversion of syngas to methanol wherein the catalyst is utilized in an oil slurry. However, the present invention will also be useful for vapor phase processes for methanol synthesis.

During the improvement of the catalyst according to the present invention, the catalyst particles preferably remain dispersed in an inert liquid such as oil which is conventionally used in liquid phase methanol synthesis. The catalyst in such instance should be maintained in suspension by a means of mechanical stirring while the gas is bubbled or sparged through the slurry.

A preferred feed gas is a syngas containing at least 7% by volume of carbon dioxide and no carbon monoxide. A typical feed gas which meets this requirement will contain about 35 to 70% hydrogen, 25 to 55% carbon dioxide and up to about 15% methane. Preferably the partial pressure of carbon dioxide is greater or equal to about 5 atm.

In a particularly preferred embodiment a methanol synthesis catalyst comprising copper, zinc oxide and alumina is reacted with a syngas containing about 65% by volume hydrogen, 30% by volume $CO_2$ and about 5% by volume methane in an oil slurry at a temperature of about 250° C. and a pressure of about 1000 to 1020 psig. The slurry is agitated while the synthesis gas is passed through the reactor at a flow rate of about 2.7 mols/hr. After around 12 hours the catalyst has been sufficiently improved to improve its methanol synthesis activity by about 10 to 15%.

While not intending to be bound by any particular theory, it is believed that the presence of zinc carbonate, as opposed to zinc oxide, in the catalyst slows down the rate of crystallite growth. Crystallite growth during the catalytic reaction of the syngas to form methanol decreases the catalytic activity. It is also believed that the formation of zinc carbonate solidifies the solid structure of the catalyst, which in turn makes the catalyst less susceptible to hydrothermal synthesis as well as ingredient leaching in the slurry.

The present invention is advantageous because it may improve the catalytic activity of the catalyst by about 10 to 15% at virtually no cost to the overall methanol synthesis process, since the activation improvement can be performed in situ without shutting down the methanol synthesis process. The present invention is preferably particularly adaptable to the LPMEOH™ process (liquid phase methanol synthesis process) in which the catalyst is slurried in an inert oil. The post-treatment improvement process according to the present invention may be equally beneficial to vapor phase methanol synthesis processes.

The following example is given to illustrate the invention but is not intended to limit the invention in any way.

EXAMPLE 1

The catalyst is post-treated using a syngas not containing carbon monoxide (CO), whose compositions are $H_2:CO_2:CH_4=65.1:30.3:4.6$, or approximately 65:30:5. This post-treatment is done after the standard reduction procedure as described in *Fuel Science & Technology, Int'l* Vol. 5, No. 1, pp. 77–88, 1987. The post-treatment is also done in situ, at 250° C., 1015 psig, 80 g cat/550 ml oil, in an agitated one-liter autoclave with the speed of agitation at 1500 rpm. The post-treatment is carried out in a continuous mode at 2.5786 mols/hr (gas feed) for 12 hours.

Table 1 shows the activity change of the post-treated catalyst under normal co-rich syngas conditions $H_2:CO:CO_2:CH_4=36.7:47.5:8.3:7.5)$. This syngas composition is closer to typical Koppers-Totzek process output (termed "normal" CO-rich syngas). In this table, the first data column labeled "initial" is the beginning of the long-term activity study of the post-treated catalyst following the procedure described above. The table shows the change in its methanol productivity and other kinetic information as a function of time. In comparison, Table 2 shows the activity change of the reduced, but untreated catalyst under the same process conditions.

Comparing the two Tables 1 and 2, the following can be concluded:
(1) The catalyst treated according to the invention maintains catalytic activity better than the untreated catalyst;
(2) After a long-term use, the catalyst according to the invention still contains $ZnCO_3$ (as long as the reactor system has not been depressurized). Therefore, one can see that $ZnCO_3$ once formed is quite stable as long as the partial pressure of $CO_2$ in the system is higher than ca. 3 atm, but preferably 5 atm.
(3) As for the catalyst crystal size growth, it becomes evident that the $ZnCO_3$ existence slows down the rate of crystallite growth. FIGS. 1, 2 and 3 show the crystal size distribution of (a) freshly reduced catalyst, (b) catalyst post-treated and used for 60 hours in the reaction environment, and (c) catalyst untreated and used for 60 hours in the reaction environment, respectively.

TABLE 1

Activity Change in the Normal Syngas for
Catalyst Post-Treated in the Absence of CO
Run Number BG024
Catalyst: 80.00 g of EPJ-19
Stirrer: 1500 rpm Oil: 550 ml
Temperature: 250° C. Pressure: 1015 psig

| Reaction time, hr | Initial | 20 | 40 | 60 |
|---|---|---|---|---|
| Reactor Feed Flow Rate and Mole Fractions | | | | |
| Flow, mol/h | 2.6786 | 2.6786 | 2.6785 | 2.6786 |
| Hydrogen | 0.3666 | 0.3695 | 0.3699 | 0.3703 |
| CO | 0.4748 | 0.4729 | 0.4713 | 0.4719 |

TABLE 1-continued

Activity Change in the Normal Syngas for
Catalyst Post-Treated in the Absence of CO
Run Number BG024
Catalyst: 80.00 g of EPJ-19
Stirrer: 1500 rpm Oil: 550 ml
Temperature: 250° C. Pressure: 1015 psig

| Methane | 0.0832 | 0.0827 | 0.0829 | 0.0828 |
|---|---|---|---|---|
| $CO_2$ | 0.0755 | 0.0749 | 0.0759 | 0.0750 |
| Reactor Exit Flow Rate and Mole Fractions | | | | |
| Flow, mol/h | 1.9707 | 1.9783 | 2.0095 | 2.0150 |
| Hydrogen | 0.1620 | 0.1665 | 0.1732 | 1.1742 |
| CO | 0.4527 | 0.4558 | 0.4574 | 0.4610 |
| Methane | 0.1130 | 0.1120 | 0.1105 | 0.1100 |
| $CO_2$ | 0.1125 | 0.1077 | 0.1041 | 0.1012 |
| Water | 0.0009 | 0.0009 | 0.0008 | 0.0007 |
| Methanol | 0.1589 | 0.1571 | 0.1540 | 0.1528 |
| Reaction Rates (mol/kg Cat. h) | | | | |
| Hydrogen | −8.2823 | −8.2534 | −8.0335 | −8.0129 |
| CO | −4.7465 | −4.5615 | −4.2904 | −4.1866 |
| $CO_2$ | +0.2458 | +0.1533 | +0.0741 | +0.0376 |
| Water | +0.0218 | +0.0218 | +0.0191 | +0.0176 |
| Methanol | +3.9136 | +3.8852 | +3.8683 | +3.8498 |

| Reaction time, hr | 80 | 100 | 120 |
|---|---|---|---|
| Reactor Feed Flow Rate and Mole Fractions | | | |
| Flow, mol/h | 2.6786 | 2.6786 | 2.6785 |
| Hydrogen | 0.3707 | 0.3698 | 0.3730 |
| CO | 0.4713 | 0.4724 | 0.4699 |
| Methane | 0.0829 | 0.0828 | 0.0824 |
| $CO_2$ | 0.0750 | 0.0750 | 0.0748 |
| Reactor Exit Flow Rate and Mole Fractions | | | |
| Flow, mol/h | 2,0268 | 2,0508 | 2.0583 |
| Hydrogen | 0.1783 | 0.1826 | 0.1872 |
| CO | 0.4602 | 0.4621 | 0.4612 |
| Methane | 0.1096 | 0.1081 | 0.1073 |
| $CO_2$ | 0.0999 | 0.0976 | 0.1073 |
| Water | 0.0007 | 0.0010 | 0.0007 |
| Methanol | 0.1512 | 0.1485 | 0.1471 |
| Reaction Rates (mol/kg Cat. h) | | | |
| Hydrogen | −7.8931 | −7.6993 | −7.6716 |
| CO | −4.1220 | −3.9695 | −3.8666 |
| $CO_2$ | +0.0179 | +0.0100 | +0.0193 |
| Water | +0.0181 | +0.0254 | +0.0192 |
| Methanol | +3.8307 | +3.8065 | +3.7849 |

TABLE 2

Activity Change in the Normal Syngas
for Untreated Normal Catalyst
Run Number BG010
Catalyst: 80.00 g of EPJ-19
Stirrer: 1500 rpm Oil: 550 ml
Temperature: 250° C. Pressure: 1015 psig

| Reaction time, hr | Initial | 60 | 120 |
|---|---|---|---|
| Reactor Feed Flow Rate and Mole Fractions | | | |
| Flow, mol/h | 2.6787 | 2.6785 | 2.6786 |
| Hydrogen | 0.3744 | 0.3721 | 0.3738 |
| CO | 0.4625 | 0.4647 | 0.4631 |
| Methane | 0.0860 | 0.0855 | 0.0859 |
| $CO_2$ | 0.0771 | 0.0777 | 0.0772 |
| Reactor Exit Flow Rate and Mole Fractions | | | |
| Flow, mol/h | 1.9740 | 1.9584 | 2.0255 |
| Hydrogen | 0.1623 | 0.1608 | 0.1832 |
| CO | 0.4484 | 0.4534 | 0.4602 |
| Methane | 0.1167 | 0.1170 | 0.1136 |
| $CO_2$ | 0.1086 | 0.1101 | 0.1009 |
| Water | 0.0008 | 0.0007 | 0.0007 |
| Methanol | 0.1632 | 0.1580 | 0.1414 |
| Reaction Rates (mol/kg Cat. h) | | | |
| Hydrogen | −8.5289 | −8.5208 | −8.2188 |
| CO | −4.4238 | −4.4609 | −4.0228 |
| $CO_2$ | +0.0981 | +0.0941 | +0.0961 |
| Water | +0.0206 | +0.0164 | +0.0188 |
| Methanol | +4.0265 | +3.8671 | +3.7366 |

The above embodiments and example are provided to illustrate the scope and spirit of the invention. These embodiments and example will make apparent to those skilled in the art other embodiments and examples which are deemed to be within the contemplation of this invention.. Therefore the instant invention to be limited only by the appended claims.

It is claimed:

1. In a method for improving the catalytic activity of an alcohol synthesis catalyst comprising copper oxide, zinc oxide and a metal oxide selected from the group consisting of alumina, silica and chromia, wherein said catalyst is activated by a first pre-synthesis treatment step in a reducing atmosphere to reduce copper oxide to copper;

the improvement comprising a second pre-synthesis treatment step of exposing said catalyst, subsequent to said first pre-synthesis treatment step and prior to contacting said catalyst with a carbon monoxide-containing feed gas for alcohol synthesis, with a carbon monoxide-free atmosphere containing at least 7% by volume carbon-dioxide at a total pressure in the range of about 1 to 100 atm at a temperature in the range of about 10° to 250° C. for a period of time whereby a substantial amount of said zinc oxide in said catalyst is converted to zinc carbonate.

2. A method according to claim 1 wherein said syngas comprises hydrogen:carbon dioxide:methane in the volumetric ratios of about 65:30:5.

3. A method according to claim 1 wherein said temperature is about 250° C., the pressure of said carbon dioxide-containing atmosphere is in the range of 1000 to 1500 psig and said period of time is up to about 12 hours.

4. A method according to claim 1 wherein the partial pressure of said carbon dioxide gas in said carbon dioxide-containing atmosphere is greater than or equal to about 5 atm.

5. A process according to claim 1 wherein said process is conducted in situ in the same reactor in which the alcohol synthesis is conducted.

6. A process according to claim 1 wherein said catalyst is in an oil slurry.

* * * * *